United States Patent
DeBry (10) Patent No.: US 6,385,728 B1
(45) Date of Patent: May 7, 2002

(54) SYSTEM, METHOD, AND PROGRAM FOR PROVIDING WILL-CALL CERTIFICATES FOR GUARANTEEING AUTHORIZATION FOR A PRINTER TO RETRIEVE A FILE DIRECTLY FROM A FILE SERVER UPON REQUEST FROM A CLIENT IN A NETWORK COMPUTER SYSTEM ENVIRONMENT

(75) Inventor: Roger K. DeBry, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/978,793

(22) Filed: Nov. 26, 1997

(51) Int. Cl.$^7$ ................................................ G06F 11/00
(52) U.S. Cl. ........................ 713/201; 709/229; 713/200
(58) Field of Search ...................... 380/25, 49; 709/229; 713/201, 202; 707/1, 9; 340/825.34

(56) References Cited

U.S. PATENT DOCUMENTS

| | | | |
|---|---|---|---|
| 5,005,200 A | 4/1991 | Fischer | 380/30 |
| 5,014,221 A | 5/1991 | Mogul | 364/519 |
| 5,214,702 A | 5/1993 | Fischer | 380/30 |
| 5,473,691 A | 12/1995 | Menezes et al. | 380/25 |
| 5,537,626 A | 7/1996 | Kraslavsky et al. | 395/828 |
| 5,544,322 A | 8/1996 | Cheng et al. | 395/200.12 |
| 5,633,932 A * | 5/1997 | Davis et al. | 713/176 |
| 5,742,759 A * | 4/1998 | Nessett et al. | 713/201 |

FOREIGN PATENT DOCUMENTS

| | | |
|---|---|---|
| JP | 08-212293 | 8/1996 |
| TW | 273061 | 3/1996 |
| WO | WO96/25812 | 8/1996 |

OTHER PUBLICATIONS

G. Walter, "Packetprint for Electronic Signature or Message Authentication", IBM Technical Disclosure Bulletin, vol. 23, No. 7B, pp. 3325–3327, Dec. 1980.

D.E. Coe et al., "Developing and Deploying a Corporate Wide Digital Signature Capability", SIGSAC Rev. (USA), vol. 13, No. 3, pp. 5–8, Jul. 1995.

* cited by examiner

Primary Examiner—Gail Hayes
Assistant Examiner—Ho S. Song
(74) Attorney, Agent, or Firm—David W. Victor; Konrad Raynes Victor & Mann (57) ABSTRACT

The system, method, and program of this invention enables a client system to pass authorization, received from a file source, to a printer to retrieve and print a file directly from the file source without the client system ever receiving a copy of the file. The client system, print server, and file source are communicatively connected across a network. When the client system requests authorization from the file source, the file source creates a "will-call" certificate which contains the distinguished name of the file source, a path to the file, a digital signature of the file source, a validity date, and a unique tracking number for that certificate created by that file source. The will-call certificate is sent to the client, which sends it on to the print server. The print server uses the distinguished name of the file source and path to the file in the will-call certificate to locate the file and request the file directly from the file source. The print server's request to the file source also includes the will-call certificate. The file source can verify various aspects of the will-call certificate's validity through the digital signature, the validity date, and/or the tracking number. If the request is valid, the file source sends the file directly to the print server.

51 Claims, 5 Drawing Sheets

FIG. 1

Copyright IBM Corporation 1997

SYSTEM, METHOD, AND PROGRAM FOR PROVIDING WILL-CALL CERTIFICATES FOR GUARANTEEING AUTHORIZATION FOR A PRINTER TO RETRIEVE A FILE DIRECTLY FROM A FILE SERVER UPON REQUEST FROM A CLIENT IN A NETWORK COMPUTER SYSTEM ENVIRONMENT

CROSS-REFERENCE TO RELATED APPLICATION

This application is related by common inventorship and subject matter to copending patent application Ser. No. 08/979,505 entitled "SECURE CONFIGURATION OF A DIGITAL CERTIFICATE FOR A PRINTER OR OTHER NETWORK DEVICE" filed on even date herewith, assigned to the Assignee hereof and entirely incorporated herein by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a network of computer systems, including but not limited to the Internet environment, and more specifically for securely printing a file retrieved from a separate file source in the network environment.

2. Description of the Related Art

A network environment can comprise an endless number of configurations, including but not limited to computer systems communicatively connected to the Internet, to a wide area network, to a local area network, using TCP/IP connections, using token ring connections, etc. Likewise, the computer systems themselves may vary from network terminals with minimal storage and CPU processing functionality to personal computers, including laptop computers to workstations to servers to mainframes. The relationship among the computers can vary, e.g., as being independent from each other, or having distributed relationships, or having client/server relationships, etc. Some or all of the files may be stored in a dedicated file storage system, e.g., a file server, database management system, etc., or within the storage of each system. Likewise, printers may be attached to any or all of the systems and/or there may be print servers to which the computer systems can be communicatively linked.

There are many different types of security issues that arise in a network environment. Some files must be encrypted at the sending end and decrypted at the receiving end to ensure that the file contents are not intercepted by an unauthorized entity during the transmission. This security feature, along with other security features that are known, can guarantee that a file has not been tampered with or can ensure the identity of the sender or receiver. Some of these security features are further discussed below.

Cryptography

Conventional cryptography, or in other words traditional symmetric cryptography, is used to maintain the privacy of the information contents. Conventional cryptography requires that the sender and receiver of an encrypted message share the same secret key. The same key is used to both scramble (encrypt) and unscramble (decrypt) information. In 1977, the National Bureau of Standards approved a block cipher algorithm referred to as the Data Encryption Standard (DES). Binary-coded data is protected by using the DES algorithm in conjunction with a key. An authorized user must have the key that was used to encipher the data in order to decipher it. Unauthorized recipients of the ciphered information content who may know the DES algorithm but who do not know the key cannot decipher the information content.

The major problem with this method is guaranteeing that both sender and receiver have the key, but no one else does. Sharing the key requires that one party send it to the other. However, since most communication networks cannot be trusted, the key itself must be encrypted. If it is sent in the clear, there is a danger that someone eavesdropping on the line could get the key and then be able to decode messages sent between the two parties. Others have sent the key via registered mail, which slows the communication process down, and begs the question of why not just send the message registered mail if time is not of the essence.

As described above, to protect the information content from unauthorized recipients, the key has to be kept secure from unauthorized users. Thus, the security of the contents depends upon the security of the key. As such, the key has to be distributed to authorized users in a secure manner.

Public Key Cryptography

Public key cryptography was first introduced by Whitfield Diffie and Martin Hellman of Standford University in 1976. It not only can be used to ensure the privacy of transmitted messages, but it can also be used in other applications, including digital signatures.

For ensuring the privacy of transmitted messages, public key cryptography does solve many of the problems, discussed above, of securely distributing the key used in conventional cryptography. Public key cryptography is based on two keys, a private key and a public key, that work together. A person's public key is openly made available to others, while their private key is kept secret. One key is used for ciphering and the other key is used to decipher information content. For each encryption key there is a corresponding, but separate and distinct, decryption key. Messages encrypted with a person's public key can only be decrypted with that person's private key. Even if one key is known, it is not feasible to compute the other key.

In a public key system, it is possible to communicate privately without transmitting any secret key. For example, the encryption key for each user is made public by being distributed or published. Anyone desiring to communicate in private with a recipient merely encrypts the message under the recipient's public key. Only the recipient, who retains the secret decrypting key, is able to decipher the transmitted message.

A combination of conventional cryptography and public key cryptography allows a secret key to be sent securely to an intended recipient. The sender encrypts a message with the secret key using the recipient's public key. The recipient then uses the recipient's private key to decrypt the message and to get the secret key for other transmissions. Since public key encryption is slower than secret key encryption, this approach allows subsequent transmissions to use the faster conventional secret key cryptography approach.

Digital Signatures

In these cryptographic systems, there is sometimes still a need to verify that the sender of a received message is actually the person named in the message. Digital signatures, which are based on public key cryptography, are used as a means to authenticate the sender of a message. A digital signature allows a digital message to be signed so that any receiver of a digitally-signed electronic message can authenticate the sender of the message and verify the integrity of the signed message. That is, the recipient is assured that the message is received as sent, and that it is not a forgery.

To ensure that the original true sender sent the message, a process just the opposite of the one used to ensure a private communication using public key cryptography described above is used. For example, a user who has made public a public key can digitally sign a message by encrypting the message, or a hash of it, with the user's private key before transmitting the message. Recipients of the message can verify the message or signature by decrypting it with the sender's public encryption key. This process is just the opposite of conventional cryptography in that the message is first encrypted by the sender using the sender's private key, and decrypted by the recipient using the sender's public key. Anyone who has the sender's public encryption key can read the message or signature. Any such recipient is assured of the authentication of the creator of the message since only the sender having the secret private key could have created the message or signature. The recipient is also assured that the message has not been altered since it was first created and the digital signature was attached to it. Any recipient can authenticate the signature and verify the integrity of the message by using only the signer's public key.

In the above example, the digital signature was the encryption, using the sender's private key, of the message itself. In the Digital Signature Standard (ANSI X9.30 Part I), a person's digital signature is a fixed-length string of bits that are attached to an electronic message of any length. To create a fixed-length digital signature, a hashing function is used that converts a message of any length to the same fixed-length hash, or digest, of the message. The Secure Hash Algorithm (SHA) is a known hash function that is part of the Digital Signature Standard. This hash of a message is like a "fingerprint" in that it is practically impossible for two distinct messages to result in identical hashes. After creating a hash of the message, the sender's private key is applied to the hash to create the digital signature for the message. The digital signature is a function of both the message being signed and the signer's private key. As long as the private key is kept secret, the digital signature cannot be created by anyone else.

Upon receipt of the digitally-signed message, the recipient uses the sender's public key to convert the digital signature to the hash that the sender computed. Next, the recipient applies the same hash function to the plain text message received and gets the hash of the received message. If the hash of the received message is identical to the hash obtained by using the sender's public key to convert the digital signature, then the recipient has authenticated the sender's digital signature and verified the integrity of the signed message.

Certificates

The identity of the signer can only be guaranteed to the extent that the receiver is assured that the public key actually belonged to the purported sender. One known technique for addressing this problem is to rely on some trusted authority, e.g., a government agency, to ensure that each public key is associated with the person claiming to be the owner. The trusted authority would create a digital message, known as a certificate, which contains the claimant's public key and the name of the claimant. A representative of the authority would sign the digital message with the authority's own digital signature. The authority's digital signature would be created by using the authority's private key, and it would be deciphered by recipients using a public key of the authority which has been widely disseminated and made available such as through telephone books, newspapers, and/or on an Internet web page. This certificate is sent along with the sender's message and the sender's digital signature. The recipient uses the authority's public key to decipher the certificate and find the sender's authentic and certified public key. The recipient then uses the sender's certified public key to verify the sender's signed message. Thus, the certificate can be easily authenticated and the message integrity verified.

Access Control Using Certificates

Typically, access to resources of a computer system ("server") from another system or user ("user") has been controlled through passwords. This requires the server to maintain a database of all authorized users and each user's password. However, if a user shares the password with another unauthorized user, the integrity of the password access control system is diminished.

In a certificate-based access control system, the server only needs to authenticate certificates issued by a certification authority. The server does not need to maintain a database about users or each user's corresponding password. To gain access to resources of the server, the user submits the user's certificate. From the certificate, which contains data that cannot be forged, the server can obtain the user's authenticated public number, personal data, and access privileges. The server can then transmit to the user a random message that the user must digitally sign with the user's private number and return it to the server. The server can then authenticate the digital signature using the public number in the certificate and check that the signed message is the same it sent to the user. With this digitally-signed response, the server can determine if the user has the correct private number corresponding to the authenticated public number in the certificate.

Secured Transmissions Between a Sender and Receiver

The above-described secure transmission techniques are best applied in situations where the messages and/or files are transmitted directly between the sender and the intended user.

In any network environment, situations may arise where a user (an individual interacting with a system via a terminal or an application running on a system) desires to print a document that is located remote from the user. The document may be protected from being accessed by anyone other than those users that have access privileges.

Typically, a user will request the document from the remote system, the remote system will verify that the user has the correct access privileges, and if so, then the remote system will send a copy of the document to the user. The user will then send the file to a printer for printing. However, such a user having access privilege may desire to print the document on a remote printer or print server but does not desire to first retrieve and store the document at the user's own local computer system (referred to for convenience as the client system). For various reasons, a user may not wish to have the document resident on the user's own machine. Some of these reasons may involve, for example, any one or more of the following: the client system may not be in a secure environment; there may be network traffic considerations; or the client system may not have the storage space for receiving the file, etc. In addition, the file server may not want a copy of the file to be stored on the client system. The owner of the file (e.g., document) may wish to control the number of copies being distributed, e.g., to protect copyright in the document and/or payment of a fee on a per-copy basis. If a copy were resident on the client machine, illegal copies could be further made from that copy, or illegal changes could be made to the document. Instead, it may be more desirable if the printer could get the document directly from wherever it may be stored and print the document.

However, in order to do this, the printer would need to have the same access privileges as the user had if the document was access protected.

There is a need to allow a print server to get a print file from a third party identified in an original request so that the document can be printed without first obtaining the file by a client system originally requesting the print file. However, when the print server gets the file, the third party must be guaranteed that the request is valid (i.e., the print server has been authorized to get the file, and the original client can legally print the document). Such a scenario is not known to be possible under existing protocols.

SUMMARY OF THE INVENTION

It is therefore an object of this invention to allow a printer to retrieve a file directly from a file source upon a request from a client based upon an authorization from the file source to the client.

It is therefore a further object of this invention to provide a printer with the same access privileges as a user that is requesting a "print by reference" printing operation.

The term "print by reference" is used herein for a printing scenario where the user does not actually retrieve the document and store the document in the user's own local computer for use as the target copy of the document for printing.

The system, method, and program of this invention enables a user, i.e., client system, to pass authorization to a printer to retrieve and print a file from a file source. The scenario is analogous to an agent requesting tickets to an event for the agent's principal. The agent gives the principal's name to the ticketing office and receives back an order number. The agent gives the order number to the principal. The principal then goes to the "will-call" window of the ticket office at the time of the event, and presents the order number and the principal's ID to the ticketing office to receive the tickets. The ticketing office knows the principal is who he purports to be by his ID, such as a driver's license which is issued by a trusted authority, i.e., the government; and knows that the principal is the one to give the tickets to because the agent identified him in the initial request, and the principal presented the order number that corresponded correctly to that initial request.

In a network printing environment, when the client requests to have a document printed, the document source (file source) issues a "will-call" certificate to the client. A "will-call" certificate guarantees the authorization to have the document accessed and is capable of being passed to a third party, i.e., a print server. The will-call certificate is created by the file source and its contents are based upon the initial user request to the file source. The certificate provides the information needed by the print server to request the print data, such as the distinguished name of the place where the document is stored and the path to the file which contains the document. The will-call certificate also contains information for the file source to verify that any such will-call certificate presented to the file source by a printer is legitimate. For instance, the will-call certificate contains a digital signature of the file source. The digital signature can be a unique signature for that specific request (making it similar to an order number in the above analogy) by using a hashing function on the other contents of the will-call certificate. The digital signature is created using a private key known only by the file source. The will-call certificate may also contain the printer ID and/or network address of the printer that the user specifies in the user's initial request to the file source as the printer that will be retrieving and printing the file. The will-call certificate may also contain the user ID making the initial request.

The client sends the will call certificate to the printer along with a request to print this file. When the printer is ready to print the data, it sends a message along with the will-call certificate to the document source requesting the document. The printer's authorization to get the document is the will-call certificate. Since the certificate contains the digital signature of the file source, it is not possible for the will-call certificate to be forged. Also, when the printer presents the will-call certificate to the file source, the file source can verify that for that digital signature of the file source contained in the will-call certificate, the printer is the printer as initially identified by the user, and the printer is at the same network address. The printer will also send to the file source, along with the will-call certificate, the printer's digital certificate so that the file source can verify that the printer is who the printer purports to be. Such a digital certificate can be one that is configured according to copending patent application Ser. No. 08/979,505 incorporated by reference.

Other embodiments incorporating a will-call certificate may include "purchased" documents that are sent to the server in a cryptolope.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
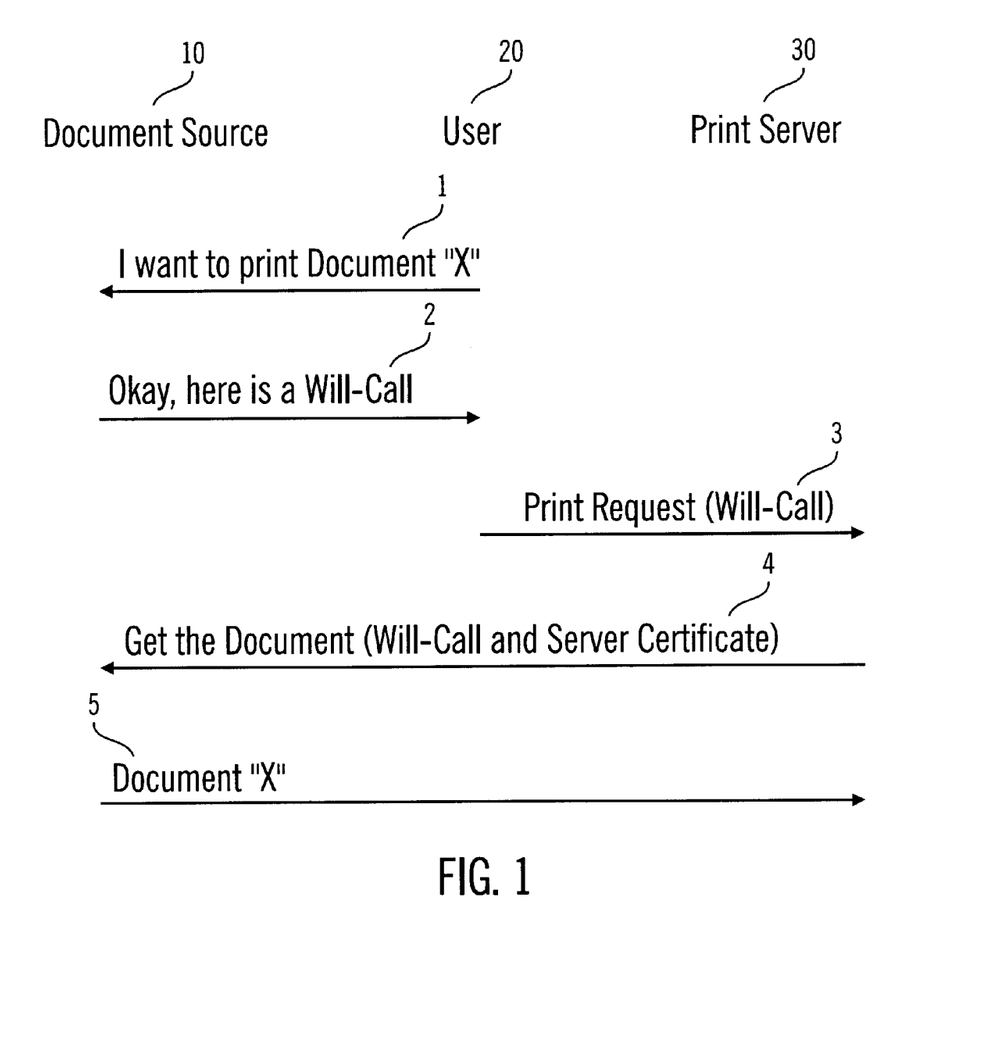
FIG. 1 illustrates the flow of information among a user, a document source, and a print server where a "will-call" certificate is included within some of the communications.

The system, method, and program of this invention is further described below with reference to FIG. 1 showing the flow of information among a user (client) 20, a document source 10, and a print server 30. A "will-call" certificate is included within some of these communications as shown and described below. A user (client) may be a user interacting through a network station, workstation, or an application program running on any type of computer system. A print server may include, but is not limited to, a stand-alone printer connected to a network; or directly connected to a server where the server is a computer that manages the function of a printer and device queuing either as a computer that is solely dedicated to such management, or as a computer that performs other tasks besides such management. Likewise, the file source may be a computer system that may or may not be solely dedicated to managing the files on the system's storage devices. Such file servers may include, but are not limited to, database management systems or digital libraries, etc.

The system, method, and program of this invention provides a user 20 the capability to go to a document source 10 and request a desire to print a document via communication 1. It should be noted that this invention allows for the situations where the user may have to pay a fee to get the right to print it, and/or provide a password to get access to it. These situations are described in other embodiments discussed below.

Upon receiving a request to print a document, the document source 10, or owner of the document, will create a will-call certificate based upon that specific user request, and will give the requesting user a will-call certificate via communication 2.

The will-call certificate 40 (FIG. 2) contains the following fields: distinguished name of the document source 41, which tells the print server exactly where to go to get the document (e.g., including the Internet address); the path to the document file 42 to find the document within the file system; and the digital signature of the provider of the document 43. When the document source created the will-call certificate, the document source digitally signed the will-call certificate using its own private key. The will-call certificate also contains a date indicating a date until which the certificate is valid 44, and a serial number for tracking purposes 45. The serial number is unique for each will-call certificate issued by the file source. This unique serial number can also be used by the file source for tracking purposes in a way that is analogous to an order number that is given when requesting tickets on a "will-call" basis.

Figure 2:
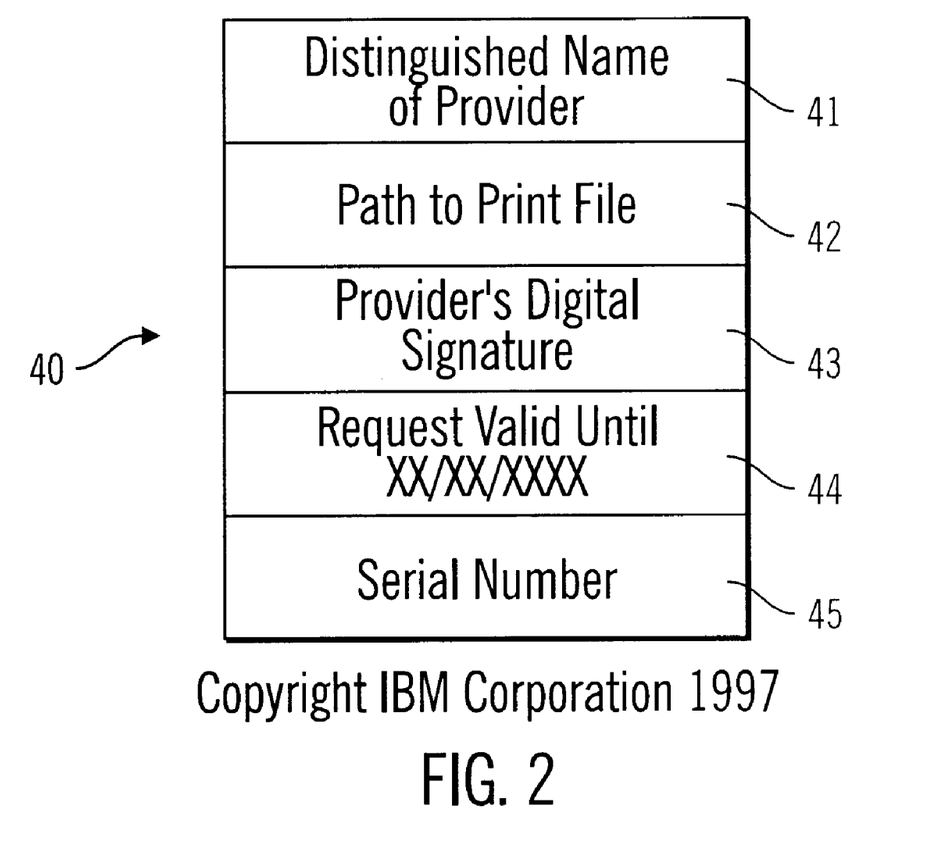
FIG. 2 is a block diagram showing the structure of the will-call certificate.

The will-call certificate may also contain fields that contain the user ID of a user requesting a file to be printed and the printer ID and network address of the printer that will be used by the user to retrieve and print the file. The will-call certificate may also contain a password or other secret information or key.

Referring back to FIG. 1, the user 20 takes the "will-call" certificate, builds a print request, and sends the print request, via communication 3, to the print server. The print request specifies which document is being requested, and where the document is. The request also contains the "will-call" certificate which gives the printer the credentials to go to the document source to get the document.

The print server 30 goes to the document source 10, requests the document, via communication 4, and gives the document source the will-call certificate which verifies that the printer is allowed to get that document. The print server also gives the document source a server certificate, or digital certificate. One such digital certificate used in the preferred embodiment of this invention is disclosed in copending patent application Ser. No. 08/979,505 No. AM9-97-053) entitled "SECURE CONFIGURATION OF A DIGITAL CERTIFICATE FOR A PRINTER OR OTHER NETWORK DEVICE" filed on even date herewith and incorporated herein by reference. This digital certificate verifies, to the document source, that the print server is who the print server represents itself as being.

If an embodiment of the invention includes fields in the will-call certificate for the printer ID and network address of the printer, as specified by a user making a request for a will-call certificate, then the document source can also verify that the printer requesting the file is the same printer as specified by the user to the document source. The document source can also verify that the print request is originating from the same network address as that specified by the user and recorded in the will-call certificate.

When the document source 10 receives the will-call certificate, the document source can verify that this certificate is indeed one that was originally issued by the document source. The document source knows that the digital signature is one that only the document source could have generated using its private key. If the digital signature is unique in that it is one that is based upon the contents of the will-call certificate by using a hashing function on the contents, then the document source can decrypt the digital signature using its private key to the hashed value. The document source can then apply the same hash function to the contents of the received will-call certificate and compare the resulting hashes to ensure that no data (e.g., name of file, printer ID, etc.) in the will-call certificate was changed after the document source signed the will-call certificate. In other embodiments, especially those not having a unique digital signature, the document source can keep its own log or database for each will-call certificate issued by associating identifying information (such as the name of the file to be retrieved and the ID of the printer initially specified by the requesting user, etc.) with the unique serial number for that will-call certificate. Then, when the will-call certificate is received back, the document source can reference the serial number in the will-call certificate and determine whether the information in the issued will-call certificate matches the information in the received will-call certificate.

After verifying that the printer is who the printer purports to be, and verifying that the will-call certificate is unchanged from the one issued by the document source, then the document source can securely send the document to the printer, via communication 5.

Network Embodiment

Figure 3:
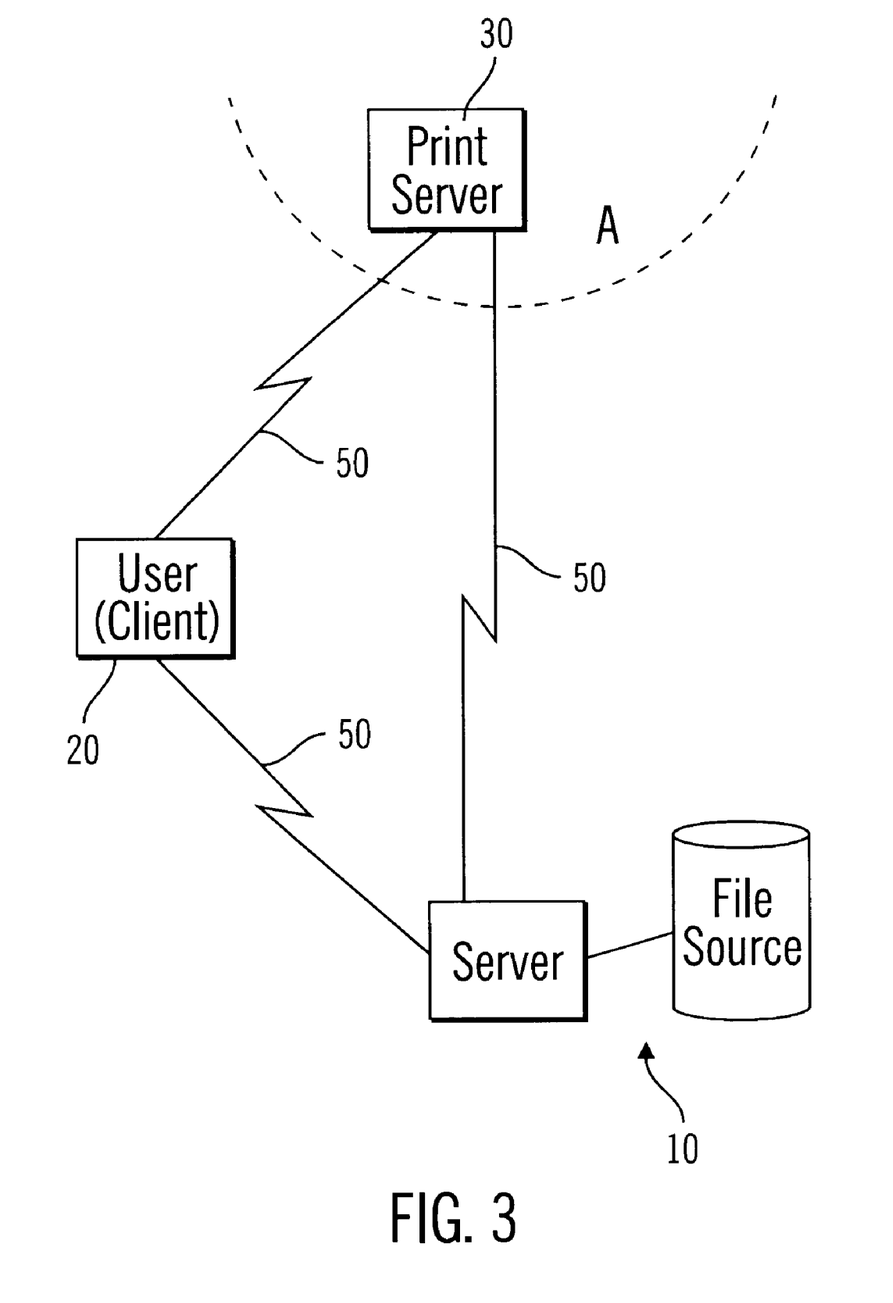
FIG. 3 shows a network configuration.

Another embodiment of the invention is shown in FIG. 3 where the print server 30 is in a physically secure environment A such that physical access to the printer's output is restricted by "lock and key" or through other similar controlled access means including password-triggered mechanisms, badge locks, etc. The file source server 10 and user/client 20 may or may not be in the same physically secure environment, or they may not be in a physically secure environment at all. Likewise, the printer, client, and server may be communicatively linked to a network such as the Internet where the communication links 50 are not secure.

Using the above-described invention, the user 20 requests a will-call certificate from the server 10 for a specific file. With the request, the user 20 sends the user's digital certificate from a trusted authority to the server 10. The server 10 can either maintain a database having an access control list to determine if the requesting user has access to the requested file, or the access authority could be a part of the user's digital certificate. Once the server 10 determines that the user 20 is authorized to have access to the file, the server 10 sends the will-call certificate, as described above, encrypted with the user's public key that the server 10 received in the user's digital certificate. The user decrypts the will-call certificate using the user's private key and encrypts it using the printer's public key that the user received from the printer's digital certificate described below. The user 20 can then send a print request to the print server 30 along with the encrypted will-call certificate which contains the server's distinguished name, the path to the requested file, and the server's digital signature which is an encryption using the server's private key. When the print system receives the encrypted will-call certificate, the printer will decrypt it using the print system's private key.

Figure 4:
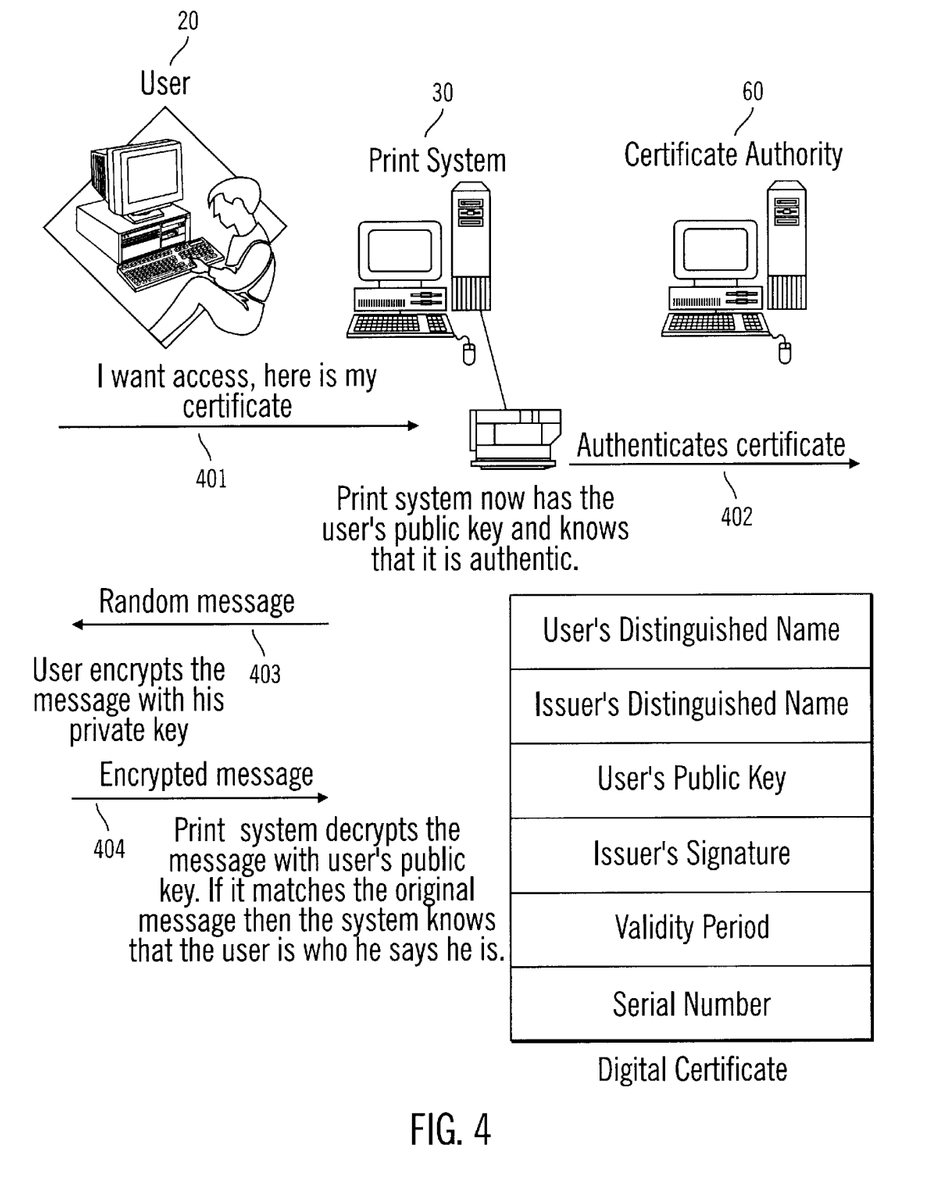
FIG. 4 illustrates the flow of information among a user, a print system, and a certificate authority for using digital certificates to control access to the print system.

FIG. 4 illustrates how digital certificates can be used to control access to the printing system 30. The printer 30 may have some kind of access control list, or the access authority may be specified in a digital certificate received from a potential user 20. It may be necessary to authenticate that the user requesting access is who the user purports to be. Besides protecting against users who do not have security clearance to use the printer, other unauthorized users could get past a simple identification/password scheme and destroy key configuration information in the printer, including information in flash memory.

A user requesting access would send, 401, such a request to the printer along with the user's digital certificate containing the user's public key. The printer may then send, 402, the public key and user identification to a certificate authority 60 to authenticate the user's digital certificate. The print system now has the user's public key and knows that it is authenticated. The printer sends, 403, to the user a random message. The user encrypts the message with its private key and sends, 404, it back to the printer. The print system decrypts the message with the user's public key. If it matches the original message, then the printing system knows that the user is who the user purports to be.

Access privileges can now be checked against an administratively established Access Control List (ACL). Further operations would only be allowed if authorized in the ACL. For example, only an authorized administrator could set up secure mailboxes, reconfigure the printer, load a new digital certificate, etc. An operator could delete jobs, but end users could only submit print jobs. Likewise, the access authority of the user 20 in FIG. 3 would be so verified.

Referring back to FIG. 3, now that the printer has verified the authentication and authority of the user 20, the printer sends a file request to the server along with the will-call certificate, which is now encrypted with the printer's private key. The printer also sends the printer's digital certificate. The printer's digital certificate can be created by the process described in copending patent application Ser. No. 08/979, 505 entitled "SECURE CONFIGURATION OF A DIGITAL CERTIFICATE FOR A PRINTER OR OTHER NETWORK DEVICE" which is herein incorporated by reference.

Essentially, the printer's digital certificate is created by a process that enables a printer's manufacturer to build a secret key into the printer during manufacturing. The printer serial number, printer model number, and the key are recorded in a secure database maintained by a certificate authority such as the printer's manufacturer. When a digital certificate is requested, the print server sends a two-part message to the certificate authority. The first part includes the printer's serial number and model number, the second part includes this same information but encrypted with the printer's built-in secret key. The certificate authority looks up in the secure database the model and serial number and finds the secret key. The secret key is used to decrypt the second part of the message. If the decrypted part of the second part of the message matches the first part, then the printer has been authenticated. The authority then sends a digital certificate to the printer encrypted with the secret key. The authority includes a public key in the certificate given to the printer and encodes the corresponding private key with the secret key from the database. The encoded secret key is sent to the printer along with the digital certificate. In one embodiment, it should be noted that the secret key built into the printer and stored in the database of the authority is only used between the printer and the authority for generating digital certificates. In such an embodiment, the secret key is not used for any other communications using traditional symmetric cryptography. Yet other embodiments may indeed use the built-in secret key for other such communications, realizing, of course, that the authentication process may be somewhat compromised.

The file server 10 then uses the public key found in the digital certificate from the printer and decrypts the will-call certificate with the file request.

It should be noted that the printer can also generate a second secret key, encrypt it using its private key, and send it to the server. The server would then decrypt the secret key using the public key from the printer's digital certificate. In another embodiment, the server could generate a secret key and send it encrypted to the printer using the printer's public key. The server can use either the secret key or the printer's public key to encrypt the file. The file server sends the encrypted file to the printer. The printer decrypts the file using the appropriate key. An embodiment uses this approach because public key encryption is slower than secret key encryption. Therefore, secret key encryption would be used by the server for large documents where decryption is being done by the printer. The printer can then decrypt the file using the same secret key.

Cryptolope Embodiment

The following describes one possible use of cryptolopes and will-call certificates to provide secure printing of documents in an electronic commerce environment. It is assumed that in the emerging world of electronic commerce, publishers will often want to sell the rights for only one printed copy, just as they would sell one copy of a printed book or journal. Allowing the printable version of the document to exist in the clear anywhere within the system places the publisher at risk, since illicit copies could be made and printed multiple times. Even if the encrypted document were to be spooled and decrypted on its way to the printer, the system could be spoofed by replacing a real printer with software. Therefore, printers in this environment should be secure in such a way that allows them to authenticate themselves, provide a unique public encryption key, and decrypt and print a document on the fly using standard decryption algorithms.

Figure 5:
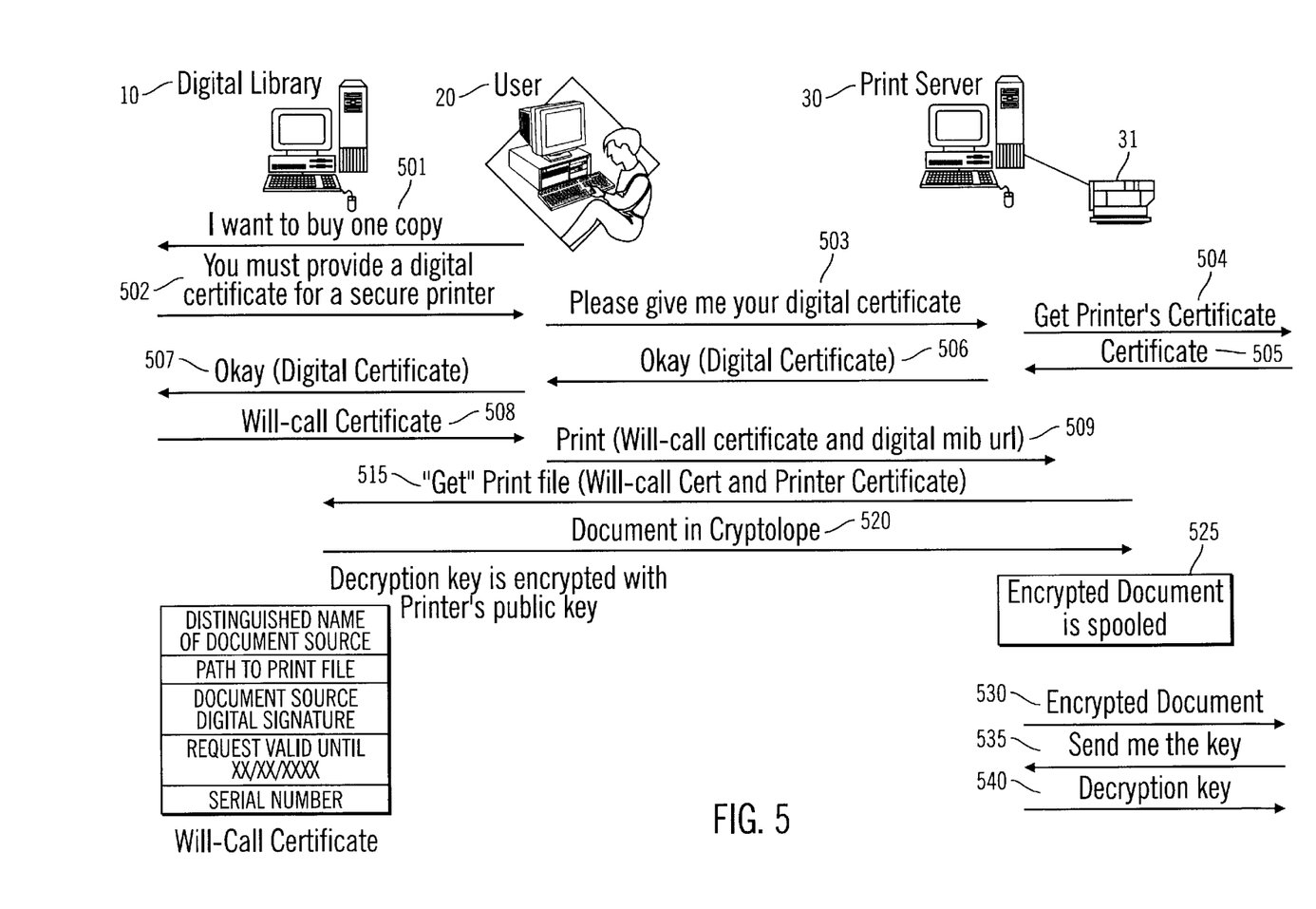
FIG. 5 illustrates the flow of information among a user, a digital library file source, a print server, and a printer for using cryptolopes and will-call certificates.

As shown in FIG. 5, the end user 20 determines that the user wants to purchase a printable copy of a document, 501. This version might differ from a nonprintable version in terms of the formatting, the use of high-quality images and fonts, and so on. It will probably be watermarked to protect the copyright. As part of the purchase transaction, the end user is informed that the end user must have access to an authenticated, secure printer to buy this document, and must provide the printer's public key certificate, 502. The user then obtains the certificate from the printer using an SNMP get, 503. It is assumed that the printer's public key certificate is stored in an SNMP MIB in the printer, 504. As described previously, the printer's public key certificate contains the printer's public encryption key along with the information necessary to authenticate the printer. This is an important step since the publisher must be assured that the printer is who the user claims it is. The certificate is sent to the publisher, 505–507.

The publisher sends, 508, the will-call certificate to the user. The user sends the will-call certificate and the publisher's URL to the print server, 509. The printer sends, 515, a message to the publisher/server to "Get Print File" and includes the will-call certificate and the printer certificate.

The publisher now builds a cryptolope for the document and sends it to the user. The document itself is encrypted with a symmetric key, and that key is encrypted using the printer's public key, 520.

The cryptoloped document is sent to a print server to be printed. The print server places the encrypted document on the spool, 525, and holds the encryption key until the printer requests it.

The printer requests a new print job, and the encrypted document is sent to the printer 530. The printer understands that this is an encrypted document, and requests the key from the print server, 535. The server sends the key, 540, which was itself encrypted using the printer's public key. The printer decrypts the key and then uses the key to decrypt the document as it prints it.

Using the foregoing specification, the invention may be implemented as a machine, process, or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the Internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, printers, or any subcomponents or individual parts of one or more processing systems, including software, firmware, hardware, or any combination or subcombination thereof, which embody the invention as set forth in the claims.

One skilled in the art of computer science will easily be able to combine the software created as described with appropriate general purpose or special purpose computer hardware to create a computer system and/or printing system and/or subcomponents embodying the invention and to create a computer system and/or printing system and/or subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, some modifications and adaptations may include the following:

the described embodiments could have additional secured transaction features not specifically described, or features or various combinations of the features described could be omitted from other embodiments.

It should also be noted that the terms "file" and "document" are used interchangeably herein with the intended meaning that any document is also a file, although a file may not necessarily be limited to documents. Even when the term "document" is used, its broader "file" meaning is intended since the term "document" is being used herein merely as an example of a file.

Also, the terms printer, print server, and printing system are used interchangeably herein. Where a function of a printer is described or referred to, the printer is assumed to have connected with it the necessary functional capabilities to perform those functions such as a stand-alone printer connected to a computer, i.e., a printing system, or a print server or a printer controller, etc. In addition, a fax machine may be understood to be a printer in the context of this invention, also.

Also, the terms file server, file source, etc. are used loosely and interchangeably herein. Any such reference means any computer system that controls the storage where the file resides. The server does not have to be a dedicated "server" in the sense of client/server technology, although it could be. Likewise, the use of the term "client" is loosely used herein to mean the requester, and does not necessarily mean any specific hardware or software configurations typical of clients in a client/server environment, although such a meaning is not being excluded.

I claim:

1. A method for printing, across the internet, a file residing at a file server, the method comprising:

requesting authorization, by a first computer system to the file server, to print the file;

issuing, from the file server to the first computer system, in response to the request, a certificate capable of being passed on to a print server and containing information needed by the print server, including an Internet address of the first computer system and an identifier of the print server to print the file, to request the file;

sending the certificate from the first computer system to the print server;

sending a message, from the print server to the file server, requesting the file and including the certificate as an authorization to receive the file; and sending the file from the file server to the print server after verifying, from the contents of the certificate, that the included certificate is the same certificate issued to the first computer system and that the print server sending the message requesting the file is the print server identified in the certificate.

2. The method of claim 1, wherein the request from the first computer system provides information on an identity of the print server that will request the file.

3. The method of claim 1, wherein the request from the first computer system includes a print server public key, wherein the print server has a private key that is capable of decrypting data encrypted using the print server public key, further comprising:

encrypting the file with the file server, wherein a file server key is needed to decrypt the file, wherein the encrypted file is sent to the print server; and encrypting, with the file server, the file server key with the print server public key; and sending the encrypted file server key to the printer server, wherein the print server decrypts the file server key using the print server private key and then decrypts the file using the decrypted file server key to access the file to print.

4. A network system including a first computer system, a print server, and a file server communicatively connected across the Internet, the network system comprising:

means for requesting authorization, by a first computer system to the file server, to print a file;

a certificate, issued by the file server to the first computer system, in response to the request, containing a digital signature of the file server and containing information needed by the print server, including the Internet address of the first computer system and an identifier of the print server to print the file, to request the file;

means for sending, from the first computer system, the certificate to the print server;

means for sending a message, from the print server to the file server, requesting the file and including the certificate as an authorization to receive the file; and means for verifying, from the contents of the certificate, by the file server that the included certificate is the same certificate issued to the first computer system and that the print server sending the message requesting the file is the print server identified in the certificate; and means for sending the file from the file server to the print server.

5. The network system of claim 4, wherein the request from the first computer system provides information on an identity of the print server that will request the file.

6. The network system of claim 4, wherein the request from the first computer system includes a print server public key, wherein the print server has a private key that is capable of decrypting data encrypted using the print server public key, further comprising:

means for encrypting the file with the file server, wherein a file server key is needed to decrypt the file, wherein the encrypted file is sent to the print server; and means for encrypting, with the file server, the file server key with the print server public key; and means for sending the encrypted file server key to the printer server, wherein the print server decrypts the file server key using the print server private key and then decrypts the file using the decrypted file server key to access the file to print.

7. A method, executed in a first computer system, comprising;

sending a request across a network to a file server to print a file residing at the file server by a remote printer via the network;

receiving, across the network, authorization including a digital signature of the file server and an identifier of the printer to print the file; and passing the authorization across the network to the printer to enable the printer to subsequently fetch the file directly from the file server to print the file, wherein the file server allows the printer to fetch the file if the printer requesting the file is the printer identified in the authorization.

8. The method of claim 7, wherein the request provides information on an identity of the printer that will request the file.

9. The method of claim 7, wherein the request includes a printer public key, wherein the printer has a private key that is capable of decrypting data encrypted using the printer public key, further comprising, wherein the file server encrypts the file such that a file server key is needed to decrypt the file, wherein the encrypted file is sent to the print server, wherein the printer decrypts the file server key using the print server private key and then decrypts the file using the decrypted file server key to access the file to print.

10. A first computer system, comprising:

means for sending a request across a network to a file server to print a file residing at the file server by a remote printer;

an authorization, received across the network from the file server, including a digital signature of the file server and an identifier of the printer to print the file; and means for passing the authorization across the network to the printer to enable the printer to subsequently fetch the file directly from the file server to print the file, wherein the file server allows the printer to fetch the file if the printer requesting the file is the printer identified in the authorization.

11. The system of claim 10, wherein the request provides information on an identity of the printer that will request the file.

12. The system of claim 10, wherein the request includes a printer public key, wherein the printer has a private key that is capable of decrypting data encrypted using the printer public key, further comprising, wherein the file server encrypts the file such that a file server key is needed to decrypt the file, wherein the encrypted file is sent to the print server, wherein the printer decrypts the file server key using the print server private key and then decrypts the file using the decrypted file server key to access the file to print.

13. The system of claim 10 wherein the authorization contains information as to a location of the file.

14. The system of claim 10 wherein the authorization contains a distinguished name of the file server and a path of the file.

15. A method, executed in a file server, comprising:

granting, in response to a request from a first computer system for authorization for access to a file residing at the file server, a certificate of authorization, including within its contents a digital signature of the file server and an identifier of a print server to print the file, capable of being passed to the print server over a network from the first computer system;

receiving, across the network, the certificate of authorization from the print server requesting direct access to the file for printing;

verifying, through the contents of the certificate, that the certificate is a same unchanged certificate that was granted to the first computer system and that the print server requesting direct access to the file is the printer server identified in the data structure; and sending the file to the print server if the certificate and identity of the requesting print server are verified.

16. The method of claim 15, wherein the granted certificate of authorization is encrypted with a private key that can only be decrypted with the private key, wherein verifying the certificate of authorization further comprises decrypting the data structure with the private key.

17. The method of claim 15, wherein the certificate of authorization further includes a serial number in the data structure to identify the data structure, further comprising;

logging an entry when creating the certificate of authorization indicating the serial number of the data structure and the identity of the print server and the file to which the data structure enables access, and wherein verifying the data structure further comprises determining whether the logged information matches the serial number, identity of the print server, and the file to access indicated in the data structure being verified.

18. The method of claim 15, wherein the request from the first computer system provides information on an identity of the print server that will request the file.

19. The method of claim 15, wherein the request from the first computer system includes a print server public key, wherein the print server has a private key that is capable of decrypting data encrypted using the print server public key, farther comprising:

encrypting the file, wherein a file server key is needed to decrypt the file, wherein the encrypted file is sent to the print server; and encrypting the file server key with the print server public key, wherein the print server decrypts the file server key using the print server private key and then decrypts the file using the decrypted file server key to access to print.

20. A file server comprising:

means for receiving a request from a first computer system for authorization for access to a file residing at the file server by a remote print server across a network;

a data structure, on a computer-usable medium, created in response to the request, containing information needed by the print server to access the file and information needed by the file server to guarantee validity of the data structure, wherein the data structure identifies the print server that will request the file for printing;

means for sending the data structure to the first computer system;

means for receiving, from across the network, the data structure from the print server requesting direct access to the file for printing;

means for verifying, through the contents of the data structure, that the data structure is a same unchanged data structure that was sent to the first computer system and that the print server requesting direct access to the file is the printer server identified in the data structure; and sending the file to the print server if the data structure and identity of the requesting print server are verified.

21. The file server of claim 20, wherein creating the data structure further comprises encrypting the data structure with a private key that can only be decrypted with the private key, wherein the means for verifying the data structure further comprises decrypting the data structure with the private key.

22. The file server claim 20, wherein creating the data structure further comprises including a serial number in the data structure to identify the data structure, further comprising;

logging an entry when creating the data structure indicating the serial number of the data structure and the identity of the print server and the file to which the data structure enables access, and wherein verifying the data structure farther comprises determining whether the logged information matches the serial number, identity of the print server, and the file to access indicated in the data structure being verified.

23. The file server of claim 20, wherein the request from the first computer system provides information on the remote print server that will request the file.

24. The file server of claim 20, wherein the request from the first computer system includes a remote print server public key, wherein the print server has a private key that is capable of decrypting data encrypted using the print server public key, further comprising:

encrypting the file, wherein a file server key is needed to decrypt the file, wherein the encrypted file is sent to the print server; and encrypting the file server key with the print server public key, wherein the print server decrypts the file server key using the print server private key and then decrypts the file using the decrypted file server key to access to print.

25. The file server of claim 20 wherein the data structure contains a digital signature of the file server.

26. The file server of claim 20 wherein the data structure contains a distinguished name of the file server, a path to the file, a digital signature of the file server, a validity date, and a unique number for the data structure created by the file server.

27. The file server of claim 20 wherein the data structure contains a printer ID and network address of a print server specified in the request.

28. A computer program, on a computer useable medium, wherein the computer program is capable of causing a server including at least one file to perform:

receiving a request from a first computer system for authorization for access to a file residing at a file server by a remote print server across a network, wherein the request provides information on the remote print server that will request the file;

creating a data structure in response to the request containing information needed by the print server to access the file and information needed by the file server to guarantee validity of the data structure, wherein the data structure identifies the print server that will request the file for printing;

sending of the data structure to the first computer system;

receiving, from across the network, the data structure from the printer server requesting direct access to the file for printing;

verifying, through the contents of the data structure, that the data structure is a same unchanged data structure that was sent to the first computer system and that the print server requesting direct access to the file is the printer server identified in the data structure; and enabling the sending of the file to the print server if the data structure and identity of the requesting print server are verified.

29. The computer program of claim 28, wherein the means for creating the data structure further comprises encrypting the data structure with a private key that can only be decrypted with the private key, wherein the means for verifying the data structure further comprises decrypting the data structure with the private key.

30. The computer program of claim 28, wherein creating the data structure further comprises including a serial number in the data structure to identify the data structure, further comprising;

logging an entry when creating the data structure indicating the serial number of the data structure and the identity of the print server and the file to which the data structure enables access, and wherein verifying the data structure further comprises determining whether the logged information matches the serial number, identity of the print server, and the file to access indicated in the data structure being verified.

31. The computer program of claim 28, wherein the request from the first computer system provides information on the remote print server that will request the file.

32. The computer program of claim 28, wherein the request from the first computer system includes a print server public key, wherein the print server has a private key that is capable of decrypting data encrypted using the print server public key, further comprising:
    encrypting the file, wherein a file server key is needed to decrypt the file, wherein the encrypted file is sent to the print server; and
    encrypting the file server key with the print server public key, wherein the print server decrypts the file server key using the print server private key and then decrypts the file using the decrypted file server key to access to print.

33. A method, executed in a print server, comprising:
    receiving a request from a first computer system across a network to retrieve a file from a file server across the network for printing by the printer server for the first computer system;
    receiving a certificate with the request containing information needed by the print server to locate the file and to guarantee an authorization from the file server to retrieve the file for printing, wherein the certificate identifies the print server, wherein the file server verifies that the print server using the certificate to access the file is the printer server identified in the certificate;
    sending the certificate, across the network, to the file server; and
    receiving the file from the file server.

34. The method of claim 33, further comprising:
    receiving a file server key encrypted with a printer server public key, wherein the file received from the file server is encrypted and can be decrypted with the file server key;
    decrypting the file server key with the print server public key; and
    decrypting the file using the decrypted file server key to access to print.

35. A print server, comprising:
    means for receiving a request from a first computer system across a network to retrieve a file from a file server across the network for printing by the printer server for the first computer system;
    a data structure, received with the request, resident on a computer-usable medium, containing information needed by the print server to locate the file and to guarantee an authorization from the file server to retrieve the file for printing, wherein the certificate identifies the print server, wherein the file server verifies that the print server using the certificate to access the file is the printer server identified in the certificate;
    means for sending the certificate, across the network, to the file server; and
    means for receiving the file from the file server.

36. The system of claim 35 wherein the information needed to guarantee an authorization is a digital signature of the file server.

37. The print server of claim 35, further comprising:
    means for receiving a file server key encrypted with a printer server public key, wherein the file received from the file server is encrypted and can be decrypted with the file server key;
    means for decrypting the file server key with the print server public key; and
    means for decrypting the file using the decrypted file server key to access to print.

38. A method executed across a network of a first computer system, a second computer system, and a third computer system, the method comprising:
    requesting authorization, by the second computer system to the first computer system, to retrieve a file;
    issuing, in response to the request, from the first computer system to the second computer system, a certificate including information identifying a third computer system wherein the certificate is capable of being passed on to a third computer system and containing information needed by the third computer system to request the file, and capable of being authenticated by the first computer system;
    sending the certificate and a request to retrieve the file from the second computer system to the third computer system;
    sending a message, from the third computer system to the first computer system, requesting the file and including the certificate as authorization to receive the file;
    verifying, by the first computer system, that the included certificate is a same unchanged certificate that was issued to the second computer system and that the third computer system sending the message is the same third computer system identified in the certificate; and
    sending the file to the third computer system if the certificate is verified.

39. The method of claim 38, wherein the request for authorization from the first computer system provides information identifying the third computer system that will request the file.

40. The method of claim 38, wherein the request from the second computer system for authorization includes a third computer system public key, wherein the third computer system has a private key that is capable of decrypting data encrypted using the third computer system public key, further comprising:
    encrypting, with the first computer system, the file, wherein a file key is needed to decrypt the file, wherein the encrypted file is sent to the third computer system; and
    encrypting, with the first computer system, the file key with the third computer system public key;
    decrypting, with the third computer system, the file key using the third computer system private key;
    decrypting, with the third computer system, the file using the decrypted file key to access the file.

41. A networked system having first, second, and third computer systems communicatively linked to each other for printing, by the third computer system having a printer, a file residing at a first computer system acting as a server with a file source, the system comprising:
    means for requesting authorization, by the second computer system to the first computer system, to print the file;
    means for issuing, in response to the request, from the first computer system to the second computer system, a certificate including information identifying a third computer system,
    wherein the certificate is capable of being passed on to a third computer system and containing information needed by the third computer system to request the file, and capable of being authenticated by the first computer system;
    means for sending the certificate and a request to print the file from the second computer system to the third computer system;

means for sending a message, from the third computer system to the first computer system, requesting the file and including the certificate as authorization to receive the file;

means for verifying, by the first computer system, that the included certificate is a same unchanged certificate that was issued to the second computer system and that the third computer system sending the message is the same third computer system identified in the certificate; and means for sending the file to the third computer system if the certificate is verified.

42. The system of claim 41 wherein the certificate comprises a distinguished name of the location where the file is stored.

43. The system of claim 42 wherein the distinguished name includes an Internet address of the location where the file is stored.

44. The system of claim 41 wherein the certificate comprises a path to the file.

45. The system of claim 41 wherein the certificate comprises a digital signature of the first computer system.

46. The system of claim 41 wherein the third computer system is a print server.

47. The system of claim 41 wherein the third computer system is a printing system.

48. The system of claim 41 wherein the third computer system is a fax machine.

49. The system of claim 41 wherein the first computer system comprises a database of files where the file resides.

50. The system of claim 41, wherein the request for authorization from the first computer system provides information identifying the third computer system that will request the file.

51. The system of claim 41, wherein the request from the second computer system for authorization includes a third computer system public key, wherein the third computer system has a private key that is capable of decrypting data encrypted using the third computer system public key, further comprising:

means for encrypting, with the first computer system, the file, wherein a file key is needed to decrypt the file, wherein the encrypted file is sent to the third computer system;

means for encrypting, with the first computer system, the file key with the third computer system public key;

means for decrypting, with the third computer system, the file key using the third computer system private key; and decrypting, with the third computer system, the file using the decrypted file key to access the file.

* * * * *